(12) United States Patent
Paauwe et al.

(10) Patent No.: US 11,149,556 B2
(45) Date of Patent: Oct. 19, 2021

(54) MINICORE COOLING PASSAGE NETWORK HAVING SLOPED IMPINGEMENT SURFACE

(71) Applicant: United Technologies Corporation, Farmington, CT (US)

(72) Inventors: Corneil S. Paauwe, Glastonbury, CT (US); Tracy A. Propheter-Hinckley, Rocky Hill, CT (US); Allan N. Arisi, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 75 days.

(21) Appl. No.: 16/667,949

(22) Filed: Oct. 30, 2019

(65) Prior Publication Data

US 2021/0148236 A1 May 20, 2021

Related U.S. Application Data (60) Provisional application No. 62/757,929, filed on Nov. 9, 2018.

(51) Int. Cl.
*F01D 5/18* (2006.01)
*F01D 25/12* (2006.01)

(52) U.S. Cl.
CPC .............. *F01D 5/187* (2013.01); *F01D 25/12* (2013.01); *F05B 2260/201* (2013.01)

(58) Field of Classification Search
CPC .......... F01D 5/147; F01D 5/186; F01D 5/187; F01D 25/12; F05D 2220/32; F05D 2240/123; F05D 2240/305; F05D 2260/202; F05D 2260/204; F05D 2260/2212
See application file for complete search history.

(56) References Cited

U.S. PATENT DOCUMENTS

| 6,254,334 B1 | 7/2001 | LaFleur |
| 6,514,042 B2 | 2/2003 | Kvasnak et al. |
| 7,815,414 B2 | 10/2010 | Devore et al. |

(Continued)

FOREIGN PATENT DOCUMENTS

| EP | 2565383 | 3/2013 |
| EP | 3112594 | 1/2017 |

OTHER PUBLICATIONS

European Search Report for European Patent Application No. 19208080.2 completed Jan. 21, 2020.

*Primary Examiner* — Igor Kershteyn
(74) *Attorney, Agent, or Firm* — Carlson, Gaskey & Olds, P.C.

(57) ABSTRACT

A gas turbine engine article includes an article wall that defines leading and trailing ends and first and second sides that join the leading and trailing ends. The article wall defines a cavity. A cooling passage network is embedded in the article wall between inner and outer portions of the article wall. The network has an inlet orifice through the inner portion to receive cooling air from the cavity, a plurality of sub-passages, at least one outlet orifice that is connected to the sub-passage region, and a manifold region that has a plenum upstream of the sub-passages. The outer portion of the article wall has a sloped impingement surface located opposite the inlet orifice. The sloped impingement surface is angled to divert flow of cooling air from the inlet orifice toward the plenum.

17 Claims, 5 Drawing Sheets

(56) References Cited

U.S. PATENT DOCUMENTS

| | | | |
|---|---|---|---|
| 2007/0116569 A1* | 5/2007 | Cunha | B22C 9/06 |
| | | | 416/97 R |
| 2010/0014102 A1* | 1/2010 | Blair | B22C 9/103 |
| | | | 356/630 |
| 2013/0052037 A1* | 2/2013 | Abdel-Messeh | F01D 5/186 |
| | | | 416/97 R |
| 2014/0010666 A1 | 1/2014 | Hudson et al. | |
| 2016/0362985 A1* | 12/2016 | Lacy | F01D 5/147 |

* cited by examiner

MINICORE COOLING PASSAGE NETWORK HAVING SLOPED IMPINGEMENT SURFACE

CROSS-REFERENCE TO RELATED APPLICATION

This application claims priority to U.S. Provisional Application No. 62/757,929 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

A gas turbine engine article according to an example of the present disclosure includes an article wall that defines a cavity, and a cooling passage network embedded in the article wall between inner and outer portions of the article wall. The cooling passage network has an inlet orifice through the inner portion of the airfoil outer wall to receive cooling air from the cavity, a sub-passage region including a plurality of sub-passages, at least one outlet orifice through the outer portion of the article wall that is connected to the sub-passage region, and a manifold region having a plenum upstream of the sub-passage region. The outer portion of the article wall has a sloped impingement surface located opposite the inlet orifice in the cooling passage network. The sloped impingement surface is angled to divert flow of cooling air from the inlet orifice toward the plenum.

In a further embodiment of any of the foregoing embodiments, the inlet orifice defines a central axis, and there is an angle in the cooling passage network that opens toward the plenum that is subtended by the central axis and the sloped impingement surface, and the angle is greater than 90°.

In a further embodiment of any of the foregoing embodiments, the angle is greater than or equal to 110°.

In a further embodiment of any of the foregoing embodiments, the angle is less than or equal to 160°.

In a further embodiment of any of the foregoing embodiments, the angle is from 100° to 135°.

In a further embodiment of any of the foregoing embodiments, the sloped impingement surface is non-faceted.

In a further embodiment of any of the foregoing embodiments, the manifold region includes a delivery passage connecting the inlet orifice to the plenum.

In a further embodiment of any of the foregoing embodiments, the delivery passage diverges in size from the inlet orifice.

In a further embodiment of any of the foregoing embodiments, the divergence in size in in a radial direction.

In a further embodiment of any of the foregoing embodiments, the sub-passage region includes a plurality of pedestals that define the sub-passages, and there is additionally an exit region between the sub-passage region and the at least one outlet orifice. The exit region has a plurality of flow guides.

A gas turbine engine article according to an example of the present disclosure includes an article wall that defines a cavity, and a cooling passage network embedded in the article wall between inner and outer portions of the article wall. The cooling passage network has first and second inlet orifices through the inner portion of the airfoil outer wall to receive cooling air from the cavity, a sub-passage region including a plurality of sub-passages, at least one outlet orifice through the outer portion of the airfoil wall that is connected to the sub-passage region, a manifold region having a plenum upstream of the sub-passage region, and first and second delivery passages connecting, respectively, the first and second inlet orifices to the plenum. The first and second delivery passages diverge in size from the respective first and second inlet orifices.

In a further embodiment of any of the foregoing embodiments, the size that is diverging is a radial size.

In a further embodiment of any of the foregoing embodiments, the radial size diverges at an angle of 10° to 60°.

In a further embodiment of any of the foregoing embodiments, the radial size diverges at an angle of 25° to 50°.

In a further embodiment of any of the foregoing embodiments, the plenum includes at least one flow guide.

In a further embodiment of any of the foregoing embodiments, the outer portion of the article wall has a sloped impingement surface opposite the first and second inlet orifices to divert flow of cooling air toward the plenum.

A gas turbine engine according to an example of the present disclosure includes a compressor section, a combustor in fluid communication with the compressor section, and a turbine section in fluid communication with the combustor. The turbine section has a gas turbine engine article that includes an article wall that defines a cavity, and a cooling passage network embedded in the article wall between inner and outer portions of the article wall. The cooling passage network has an inlet orifice through the inner portion of the article wall to receive cooling air from the cavity, a plurality of sub-passages that extend axially from the at least one inlet orifice, and at least one outlet orifice through the outer portion of the article wall. The outer portion of the article wall has a sloped impingement surface located opposite the inlet orifice in the cooling passage network. The sloped impingement surface is angled to divert flow of cooling air from the inlet orifice toward the sub-passages.

In a further embodiment of any of the foregoing embodiments, the inlet orifice defines a central axis, and there is an angle in the cooling passage network that opens toward the plenum that is subtended by the central axis and the sloped impingement surface, and the angle is from 100° to 160°.

In a further embodiment of any of the foregoing embodiments, the manifold region includes a delivery passage connecting the inlet orifice to the plenum.

In a further embodiment of any of the foregoing embodiments, the delivery passage diverges in radial size from the inlet orifice, and the sloped impingement surface is non-faceted.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
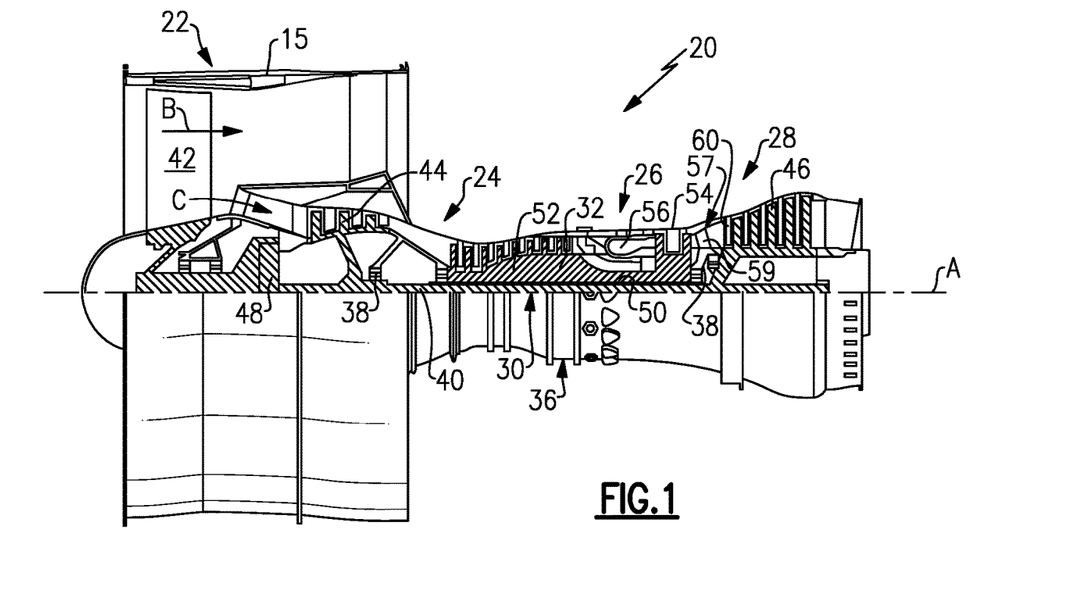
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{\wedge}0.5$. The "Low corrected fan tip speed" as disclosed herein according to one non-limiting embodiment is less than about 1150 ft/second (350.5 meters/second).

Figure 2:
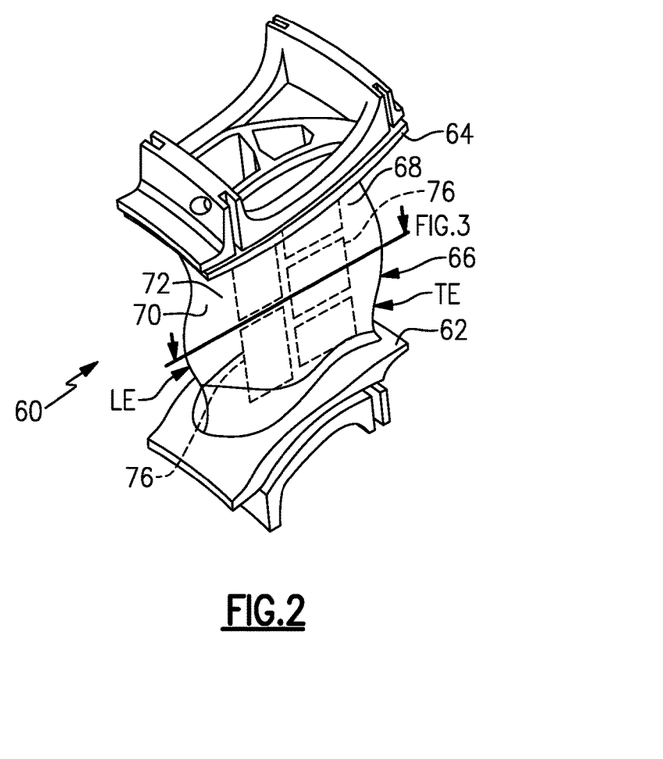
FIG. 2 illustrates an airfoil of the engine of FIG. 1.

FIG. 2 illustrates a representative example of a gas turbine engine article, namely a turbine airfoil 60 used in the turbine engine 20 (see also FIG. 1). As shown, the turbine airfoil 60 is a turbine vane; however, it is to be understood that, although the examples herein may be described with reference to the turbine vane, this disclosure is also applicable to turbine blades and blade outer air seals. The turbine airfoil 60 is also shown in a cross-sectioned view in FIG. 3.

Figure 3:
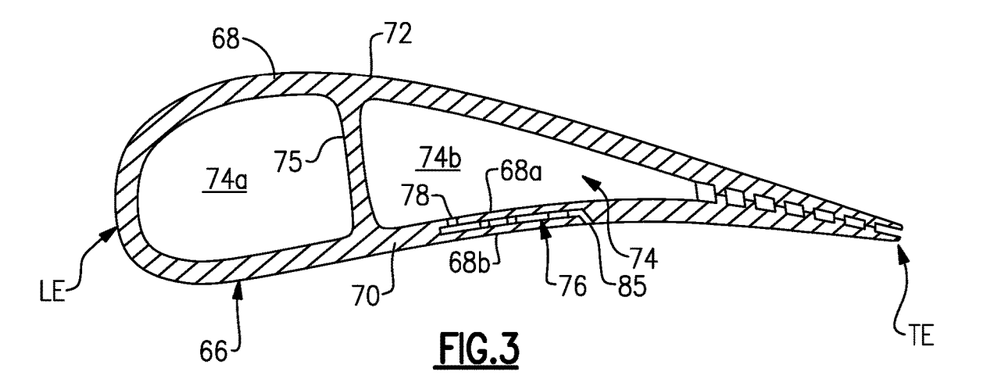
FIG. 3 illustrates a sectioned view of the airfoil of FIG. 3.

Referring to FIGS. 2 and 3, the turbine airfoil 60 includes an inner platform 62, an outer platform 64, and an airfoil section 66 that spans between the inner and outer platforms 62/64. The airfoil section 66 includes an article wall or airfoil outer wall 68 that delimits the profile of the airfoil section 66. The outer wall 68 defines a leading end (LE), a trailing end (TE), and first and second sides 70/72 that join the leading and trailing ends. In this example, the first side 70 is a pressure side and the second side 72 is a suction side. The outer wall 68 circumscribes an internal core cavity 74, which in this example is partitioned by a rib 75 into a forward core cavity 74a and an aft core cavity 74b. As will be appreciated, there may alternatively be only a single core cavity or there may be additional ribs to partition additional core cavities.

The airfoil section 66 includes at least one hybrid skin core cooling passage network 76 embedded in the airfoil outer wall 68 between inner and outer portions 68a/68b of the airfoil wall 68. A hybrid skin core or minicore cooling passage refers to a thin low aspect ratio investment casting core(s) that has one hot wall which is located approximate to the external wall on one side, and one cold wall which divides the hybrid core from the internal main body core. For example, as shown (FIG. 3) one or more of the hybrid cooling passage networks 76 is embedded in the second side 72 of the outer wall 68, although one or more networks 76 could additionally or alternatively be embedded in the first side 70. It should be appreciated that such hybrid skin cores or minicores may have heat transfer augmentation features to increase heat transfer from the outer wall 68. Such heat transfer augmentation features may include, but are not limited to, pedestals, tripstrips, pin fins, dimples etc. These heat transfer augmentation features may be used independently and/or in combination with one another depending on the desired heat transfer, pressure loss and general flow characteristics within the minicore.

Figure 4:
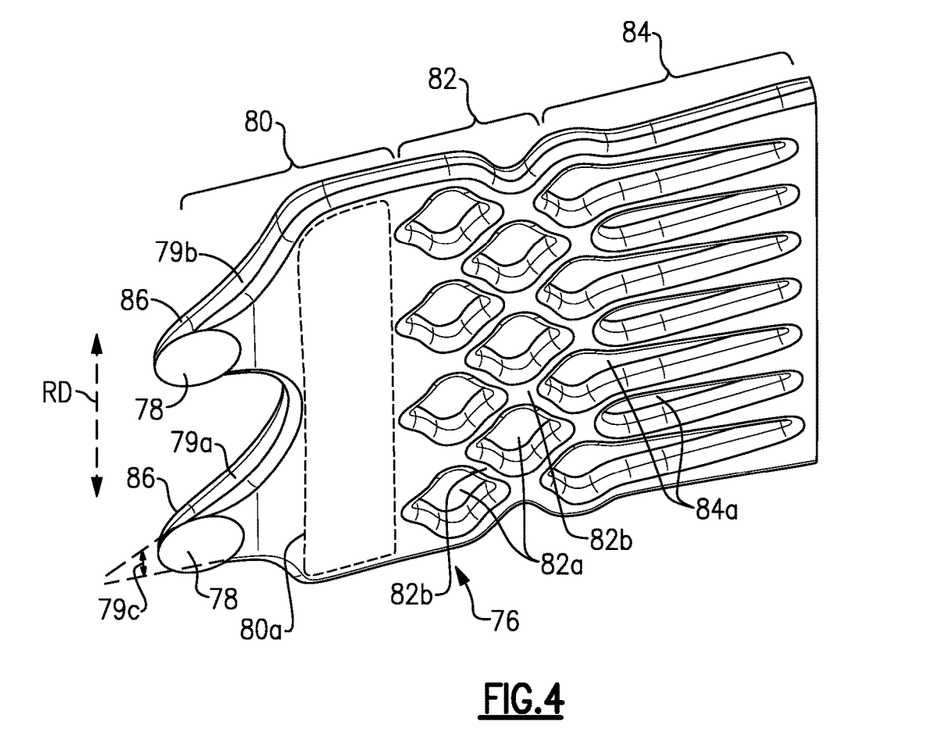
FIG. 4 illustrates an "inverse" or negative view of a cooling passage network of the airfoil of FIG. 3.
Figure 5:
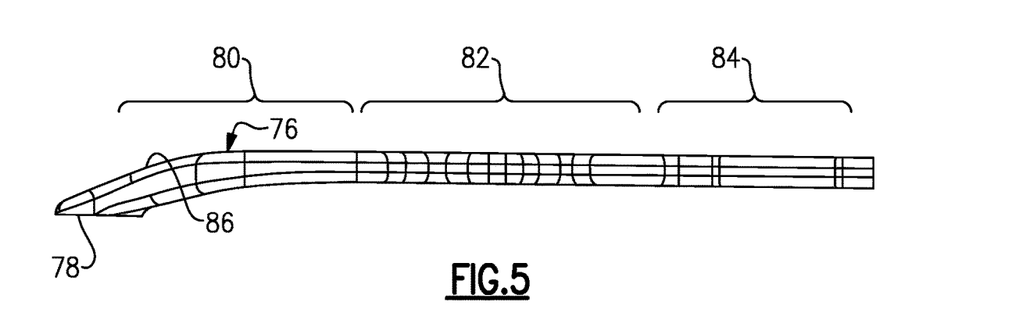
FIG. 5 illustrates an "inverse" or negative side view of the cooling passage network of FIG. 4.

FIG. 4 shows an "inverse" or negative view (perspective) of a representative minicore cooling passages network 76, and FIG. 5 shows the inverse side view of the same cooling passages network 76. The inverse view is also representative of an investment core that may be used in an investment casting process to form the cooling passages network 76 in the airfoil 60 as shown in FIG. 3. Most typically, the investment casting core is injection molded from a material that contains ceramic or metal alloy. The investment core is shaped to form the minicore cooling passage network 76. In the inverse view, solid structures of the investment core produce void structures for the minicore cooling passage network 76 and void structures of the investment core produce solid structures in the cooling passage network 76. Thus, the investment core has the negative of the structural features of the cooling passage network 76. It is to be understood that although the inverse views presented herein may be used to describe features of the network 76, each negative view also represents an investment core and a corresponding cavity in a molding tool that is operable to molding the investment core.

The minicore cooling passage network 76 includes at least one inlet orifice 78 through the inner portion 68a of the airfoil outer wall 68 (FIG. 3) to receive cooling air from the internal core cavity 74. Most typically, the network 76 will include two inlet orifices 78. A single, exclusive inlet orifice 78 is also contemplated, as well as more than two inlet orifices 78, although fabrication may be challenging. The inlet orifice 78 may have different geometry shapes that include, but not limited to circular, cylindrical, racetrack, and/or elliptical geometries. Additionally, the size of this inlet feature may vary depending on the desired flow. The inlet orifices 78 open into a radially-elongated minicore manifold region 80, which serves to uniformly distribute the cooling air to the downstream minicore sub-passages defined by the pedestal features in sub-passage region 82. In this example, the minicore inlet orifices 78 are strategically placed between radially upper and lower halves of the minicore manifold region 80. The exact radial placement of the inlet orifices 78 is dependent on the number of inlet orifices, inlet orifice size and geometry.

In this example, the sub-passage region 82 includes an array of pedestals 82a that defines a plurality of sub-passages 82b there between. For instance, the pedestals 82a are provided in radially-aligned rows and there are at least 2 rows and up to 10 rows, although in the illustrated example there are 2 rows. The pedestals 82a that are shown in FIG. 4 have a lobed-diamond cross-sectional geometry in which each of the faces of the diamond are concave such that the tips of the diamond form rounded projections, i.e., a lobes. It is to be understood, however, that the pedestals 82a may alternatively be, but are not limited to, diamond or other polygonal shape, round, oval, or elliptical. It is also to be appreciated that the minicore manifold region 80 may also include other heat transfer augmentation features such as trip strips, dimples, bumps, divots etc.

The sub-passages 82b are circuitous but extend generally axially from the plenum 80a of the manifold region 80 and inlet orifices 78 to a downstream exit region 84. In this example, the exit region 84 includes a plurality of flow guides 84a. For instance, the flow guides 84a have a teardrop shape and facilitate straightening and guiding flow into one or more outlet orifices 85 (FIG. 3) through the outer portion 68b of the airfoil wall 68.

In the illustrated example, the inlet orifices 78 are connected by first and second delivery passages 79a/79b to the plenum 80a. The delivery passages 79a/79b diverge in size from the respective inlet orifices 78. For instance, the delivery passages 79a/79b start to diverge at the edge of the inlet orifice 78 and widen toward the plenum 80a. In this example, the delivery passages 79a/79b are diverging in the radial direction RD, which is perpendicular to the engine axis A. In further examples, the delivery passages 79a/79b may diverge according to an angle, represented at 79c. For instance, the angle 79c is the angle between the radially upper and lower sides of the delivery passages 79a/79b. The angle may be 10° to 60°, but more typically will be 25° to 50°.

In comparison minicore designs, the flow into the minicore through the inlet orifices impinges on a surface that lies perpendicular to the axis of the inlet orifices. This impingement surface serves to deflect the cooling air axially into the minicore manifold region which then proceeds into the minicore sub passages region.

The cooling air that flows through the minicore inlet orifice entrains dirt, debris and particulate which also impinge on the surface perpendicular and opposite the inlet orifice. The impingement of dirt and debris onto a perpendicular surface results in significant reduction of the particulate/debris coefficient of restitution (COR) which results in the particulate deposition onto the impingement surface opposite the inlet orifice. Such accumulation and build-up of dirt particulate and debris has detrimental effects on the internal minicore heat transfer and may eventually result in flow reduction through the minicore by plugging the inlet orifice.

In this regard, in order to mitigate the propensity for dirt, debris and particulate build-up the network 76 includes a sloped impingement surface 86. This sloped impingement surface 86 provides a gentle turning of the flow into the region 80 thereby reducing the impingement strength of the inlet flow onto the sloped impingement surface 86. The gentle turning reduces the accumulation of dirt, debris and particulate entrained in the cooling air from sticking and accumulating on the sloped impingement surface 86 by increasing the particulate coefficient of restitution COR. As such, the dirt and debris impinges at a glancing angle and thereby remains entrained in the flow rather than sticking to the sloped impingement surface 86. For example, the sloped impingement surface 86 is smooth and non-faceted (see FIG. 6) in order to smoothly divert the flow toward the plenum 80a without direct impingement of dirt/debris. It should be noted that while the illustrated features reflect a circular minicore inlet orifice 78, the described concept is also applicable to minicores and/or hybrid cores with inlet orifices of different shapes and multiple or singular inlet orifices.

Figure 6:
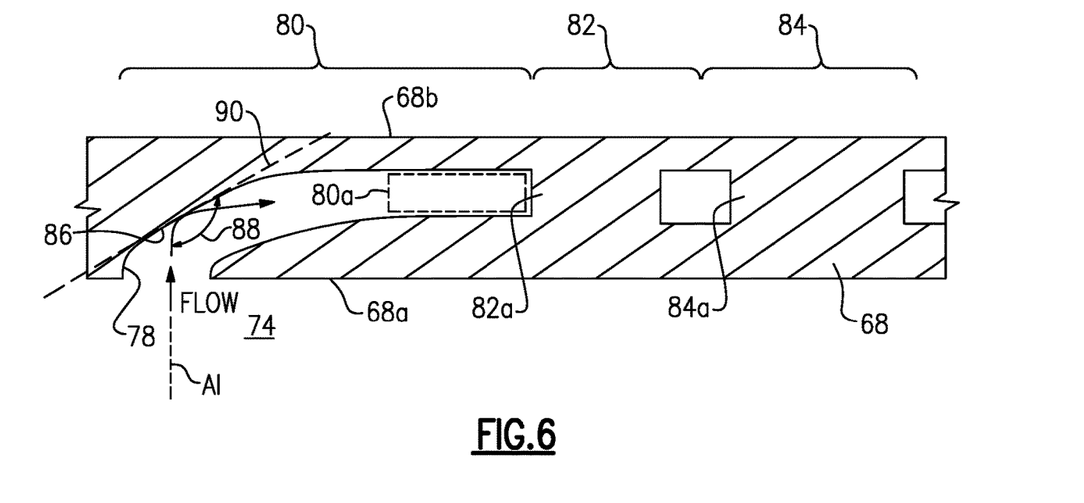
FIG. 6 illustrates a sectioned view of the cooling passage network represented in FIG. 4.

The cooling network passage 76 is shown in FIG. 6 in a sectioned view through the outer wall 68. For example, the inlet orifice 78 defines a central axis A1, and there is an angle, represented at 88, in the cooling passage network 76 that opens toward the plenum 80a. The angle 88 is subtended by the central axis A1 and the sloped impingement surface 86 (the angle of which is represented at dashed line 90). For example, the angle 88 is greater than 90°. While angles that are only modestly above 90° may facilitate dirt/debris avoidance, most typically the angle will be larger and greater than or equal to 100° or greater than or equal to 110°. Inversely, while larger angles may provide a more substantial dirt/debris avoidance, such larger angles are less effective in turning the flow toward the plenum 80a. The thickness of the outer wall 68 may also constrain the angle, as a minimum thickness of the outer portion 68b may be required. For example, the angle is less than or equal to 160° and may more typically be less than or equal to 135°.

The sloped impingement surface 86 is also configured to fully divert the flow of cooling air toward the plenum 80a. For instance, unlike a projecting structure, the entire extent of the surface 86 over the inlet orifice 78 is sloped to turn the cooling air toward the plenum 80a. That is, the sloped impingement surface 86 is larger than the area of the inlet orifice 78 such that all of the cooling air impinges at a glancing angle to avoid dirt/debris accumulation.

Figure 7:
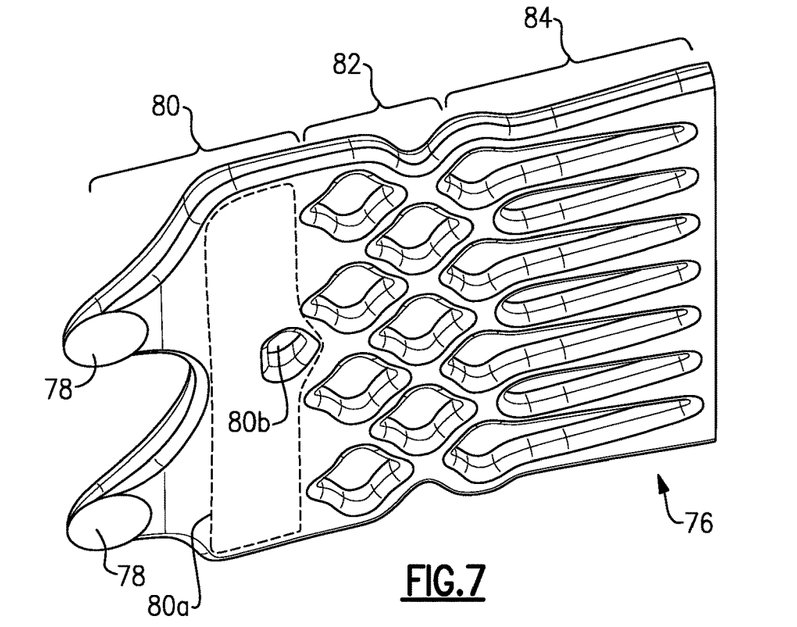
FIG. 7 illustrates an "inverse" or negative view of another example cooling passage network that has a single flow guide in the plenum.

FIG. 7 illustrates an inverse view of a modified example of the cooling passage network 76. As shown in FIG. 4, the plenum 80a is fully open and is thus free of any flow guide structures. However, the in the example shown in FIG. 7, the plenum 80a includes a single flow guide 80b. For example, the flow guide 80b is equidistant from the inlet orifices 78 and is situated in the radial middle of the plenum 80a. The flow guide 80b facilitates distribution of the cooling air from the upper one of the inlet orifices 78 into the upper portion of the sub-passage region 82, while the flow guide 80b facilitates distribution of the cooling air from the lower one of the inlet orifices 78 into the lower portion of the sub-passage region 82. The flow guide 80b thereby aid in evenly dividing the flow into the sub-passage region 82.

Figure 8:
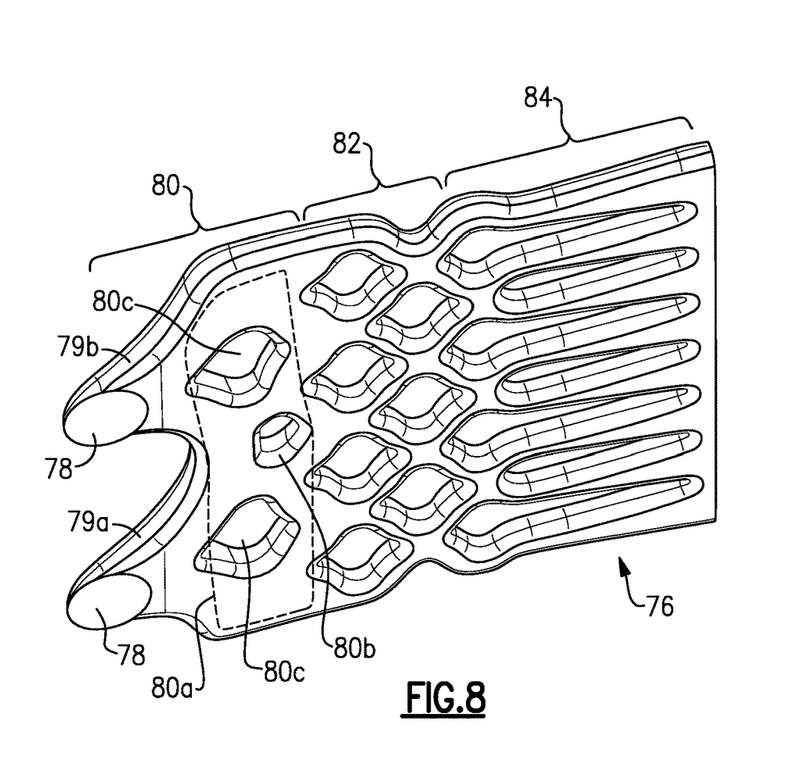
FIG. 8 illustrates an "inverse" or negative view of another example cooling passage network that has multiple flow guides in the plenum.

FIG. 8 illustrates an inverse view of another modified example of the cooling passage network 76 that is similar to the example in FIG. 7. However, in this example, the plenum 80a includes additional flow guides 80c. For example, the flow guides 80c are located at the mouths of the respective delivery passages 79a/79b, where the delivery passages 79a/79b open into the plenum 80a. The flow guides 80c further facilitate dividing the flow to evenly distribute the flow into, respectively, the upper and lower portions of the sub-passage region 82.

Figure 9:
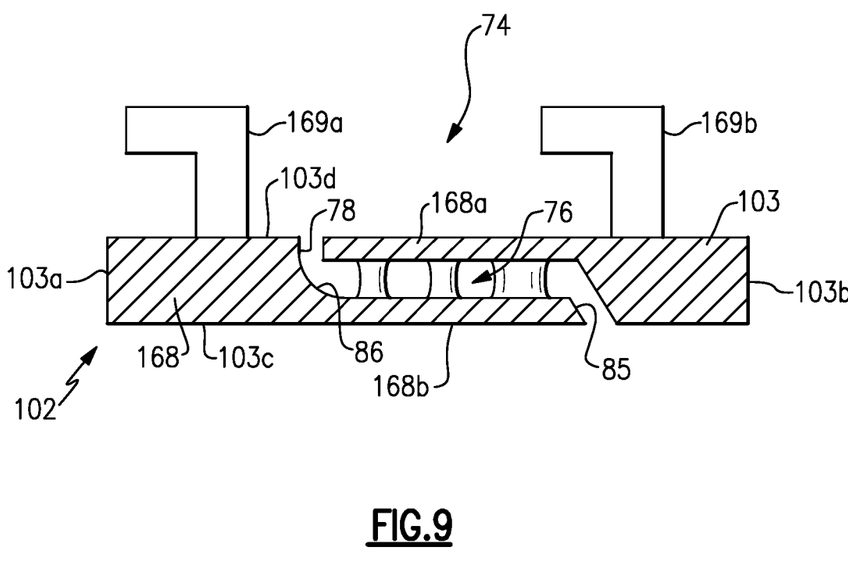
FIG. 9 illustrates an example blade outer air seal that includes a cooling passage network.

FIG. 9 illustrates another example gas turbine engine article 102, namely a blade outer air seal 103. The blade outer air seal 103 is an arc segment that is mounted in the engine 20 with like seals 103 to form an annular seal around the tips of the turbine blades. In this example, the cooling passage network 76 is employed in the blade outer air seal 103. It is to be understood that although the blade outer air seal 103 is shown with network 76, that the blade outer air seal 103 may alternatively employ any of the examples and features described or shown herein. In this example, the blade outer air seal 103 includes an article wall 168. The wall 168 defines a leading end 103a, a trailing end 103b, a gaspath side 103c, and a non-gaspath side 103d. The gaspath side 103c faces toward the core gaspath of the engine 20 and may, at times, contact tips of the turbine blades. The wall 168 defines or includes attachment members 169a/169b, which serve to secure and mount the seal 103 to a case structure in the engine 20.

The non-gaspath side 103d, and in this example also the attachment members 169a/169b, define a cavity 174. The network 76 is embedded in the wall 168 between inner and outer portions 168a/168b of the wall 168. The inlet orifice 78 of the network 76 opens through the inner portion 168a to the cavity 174. Similar to the airfoil 60, bleed air from the compressor section 24 can be provided to the cavity 174 to provide cooling air through the inlet orifice 78 into the network 76.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
  an article wall defining a cavity; and
  a cooling passage network embedded in the article wall between inner and outer portions of the article wall, the cooling passage network having an inlet orifice through the inner portion of the article wall to receive cooling air from the cavity, a sub-passage region including a plurality of sub-passages, at least one outlet orifice through the outer portion of the article wall that is connected to the sub-passage region, and a manifold region having a plenum upstream of the sub-passage region, the manifold region including a delivery passage connecting the inlet orifice to the plenum, the delivery passage diverging in size from the inlet orifice, the outer portion of the article wall having a sloped impingement surface located opposite the inlet orifice in the cooling passage network, the sloped impingement surface being angled to divert flow of cooling air from the inlet orifice toward the plenum.

2. The article as recited in claim 1, wherein the inlet orifice defines a central axis, and there is an angle in the cooling passage network that opens toward the plenum that is subtended by the central axis and the sloped impingement surface, and the angle is greater than 90°.

3. The article as recited in claim 2, wherein the angle is greater than or equal to 110°.

4. The article as recited in claim 2, wherein the angle is less than or equal to 160°.

5. The article as recited in claim 1, wherein the angle is from 100° to 135°.

6. The article as recited in claim 1, wherein the sloped impingement surface is non-faceted.

7. The article as recited in claim 1, wherein the divergence in size in in a radial direction.

8. The article as recited in claim 1, wherein the sub-passage region includes a plurality of pedestals that define the sub-passages, and there is additionally an exit region between the sub-passage region and the at least one outlet orifice, the exit region having a plurality of flow guides.

9. A gas turbine engine article comprising:
an article wall defining a cavity; and
a cooling passage network embedded in the article wall between inner and outer portions of the article wall, the cooling passage network having first and second inlet orifices through the inner portion of the article wall to receive cooling air from the cavity, a sub-passage region including a plurality of sub-passages, at least one outlet orifice through the outer portion of the article wall that is connected to the sub-passage region, a manifold region having a plenum upstream of the sub-passage region, and first and second delivery passages connecting, respectively, the first and second inlet orifices to the plenum, the first and second delivery passages diverging in size from the respective first and second inlet orifices.

10. The article as recited in claim 9, wherein the size that is diverging is a radial size.

11. The article as recited in claim 10, wherein the radial size diverges at an angle of 10° to 60°.

12. The article as recited in claim 11, wherein the radial size diverges at an angle of 25° to 50°.

13. The article as recited in claim 9, wherein the plenum includes at least one flow guide.

14. The article as recited in claim 9, wherein the outer portion of the article wall has a sloped impingement surface opposite the first and second inlet orifices to divert flow of cooling air toward the plenum.

15. A gas turbine engine comprising:
a compressor section;
a combustor in fluid communication with the compressor section; and
a turbine section in fluid communication with the combustor,
the turbine section having a gas turbine engine article that includes
an article wall defining a cavity,
a cooling passage network embedded in the article wall between inner and outer portions of the article wall, the cooling passage network having an inlet orifice through the inner portion of the article wall to receive cooling air from the cavity, a plurality of sub-passages that extend axially from the at least one inlet orifice, at least one outlet orifice through the outer portion of the article wall, and a manifold region having a plenum upstream of the plurality of sub-passages, the manifold region including at least one delivery passage connecting the at least one inlet orifice to the plenum, the at least one delivery passage diverging in size from the at least one inlet orifice, and
the outer portion of the article wall having a sloped impingement surface located opposite the at least one inlet orifice in the cooling passage network, the sloped impingement surface being angled to divert flow of cooling air from the at least one inlet orifice toward the sub-passages.

16. The gas turbine engine as recited in claim 15, wherein the at least one inlet orifice defines a central axis, and there is an angle in the cooling passage network that opens toward the plenum that is subtended by the central axis and the sloped impingement surface, and the angle is from 100° to 160°.

17. The gas turbine engine as recited in claim 15, wherein the at least one delivery passage diverges in radial size from the inlet orifice, and the sloped impingement surface is non-faceted.

* * * * *